Aug. 30, 1966  R. C. McDOWELL  3,269,643
MULTI-WALL BAG

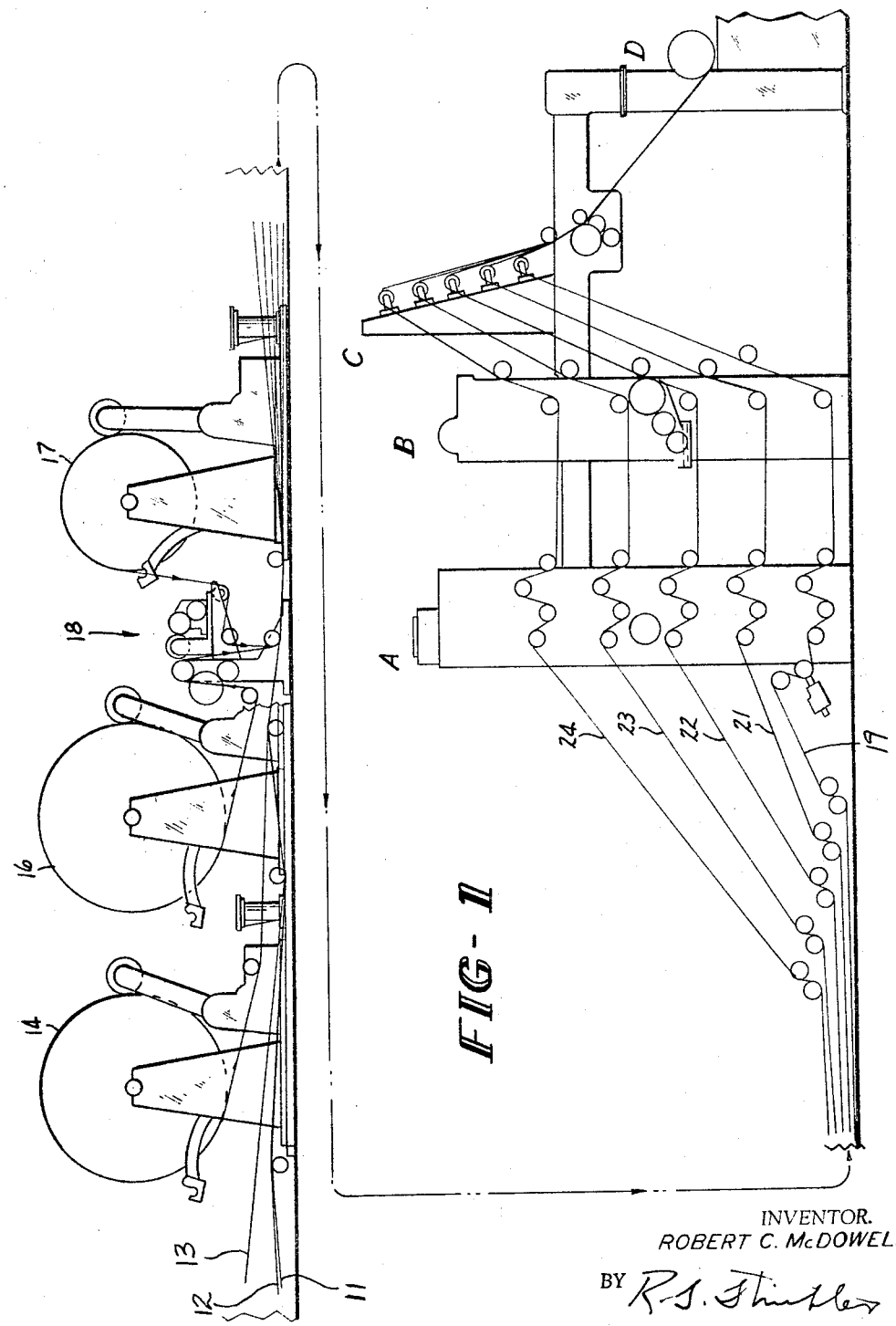

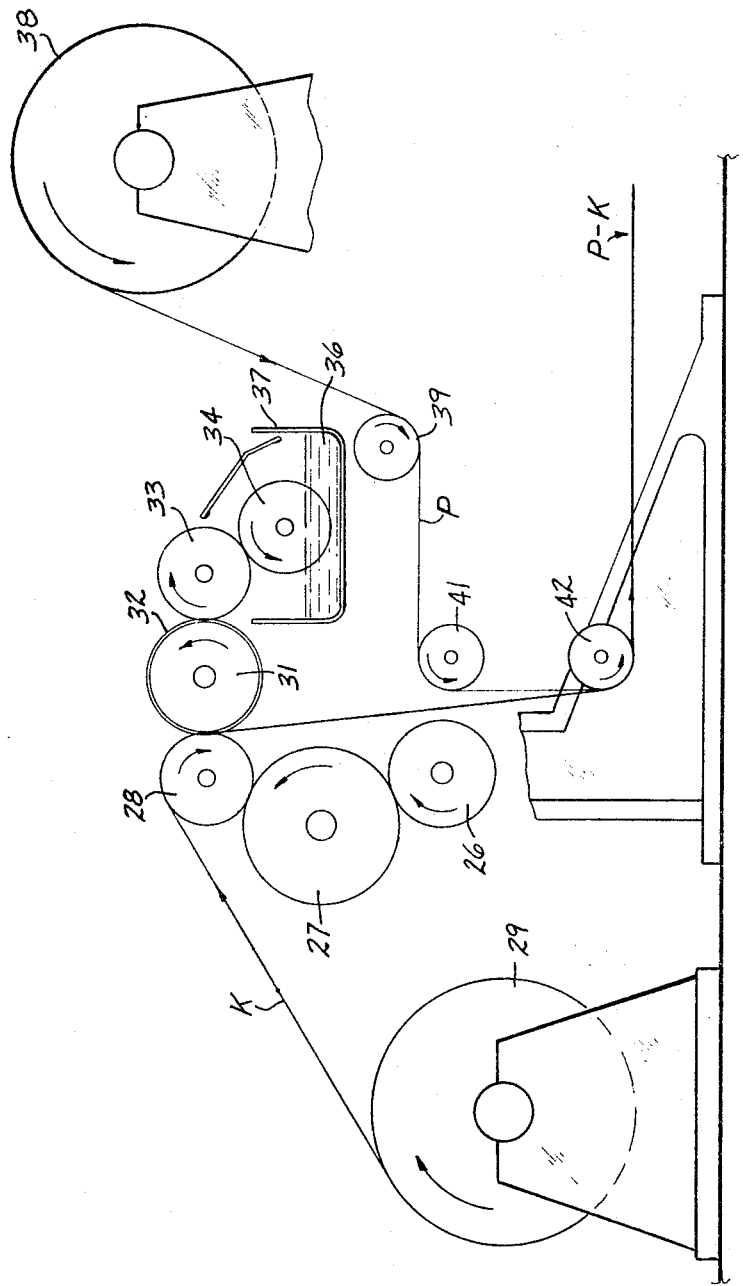

Filed March 4, 1964

INVENTOR.
ROBERT C. McDOWELL

BY

ATTORNEY

United States Patent Office 3,269,643
Patented August 30, 1966

3,269,643
MULTI-WALL BAG
Robert Cecil McDowell, Monroe, La., assignor to Olin Mathieson Chemical Corporation, a corporation of Virginia
Filed Mar. 4, 1964, Ser. No. 349,214
2 Claims. (Cl. 229—55)

The present invention has to do with multi-wall sacks including machinery and methods of operating machinery to produce multi-wall sacks.

A particular feature of the present invention is the provision of a novel multi-wall sack or bag where the bag includes at least one layer of kraft paper to which a web of polyethylene or other polyolefinic sheet material is releasably attached.

A further feature of the invention is the provision of a novel method of releasably connecting or supporting a film of polyethylene upon a sheet of kraft paper.

A further feature of the invention is the provision of novel apparatus or machinery operable to combine a continuously advancing sheet of kraft paper with a continuously advancing sheet of polyethylene film where the connection between the kraft paper and the film is a releasable one.

A further feature of the invention is the provision of machinery for feeding a plurality of webs of kraft paper including means for continuously feeding and releasably combining a film of polyethylene with a given web of kraft paper where all webs and the film are advanced in unison towards a multi-wall bag making machine.

It is a further feature of the present invention to provide a multi-wall sack structure including a plurality of layers of kraft paper where one kraft layer carries or releasably supports a film of polyethylene so that a rupture or split in the kraft paper does not rupture or split the polyethylene film.

The present invention is an improvement upon a multi-wall sack containing a layer of kraft paper upon which polyethylene has been coated, such as by use of a doctor blade or the like; rupture of kraft paper so coated invariably involves concurrent rupture of the polyethylene film.

A further feature of the present invention is the provision of a novel method of combining a polyethylene film to a sheet of kraft paper in such a way that the paper and film remain in close face-to-face contact and in alignment during bag fabrication yet the main body of the unit area of the polyethylene is movable or free relative to the kraft paper; the film being rigidly connected or fixed only at uniformly spaced intervals.

In addition, after the kraft paper and polyethylene film are converted into a multi-wall bag or sack the film is releasable from the kraft paper over wide areas.

A process embracing certain features of the present invention may comprise the steps of continuously advancing a web of kraft paper, simultaneously advancing a web of polyethylene film, continuously printing a uniform pattern of adhesive material upon the kraft paper, controlling the printing step so that area of kraft paper printed is no greater than 5 percent of a given unit area, bringing the paper and the film into face-to-face contact so that the adhesive is operative to secure the film to the paper whereby the film is releasably connected to the paper.

A multi-wall bag constructed in accordance with the principles of the present invention may comprise a plurality of layers of kraft paper suitably formed into paper tubes and concentrically disposed to define a bag wall having a plurality of kraft paper plies, one ply of said kraft paper releasably supporting a film of polyethylene, said polyethylene being connected to the kraft ply in accordance with a uniform glue pattern with intervening free areas, the ratio of the area of the glue pattern to the intervening free area for a given planar surface being about 1 to 20.

An apparatus embracing certain principles of the present invention may comprise a supply stand for supporting a roll of kraft paper and a corresponding supply stand for supporting a roll of polyethylene film, an impression or anvil roll over which the kraft paper is led, a printing roll formed or embossed with a uniform pattern of raised portions or protuberances defining lands with intervening depressions defining grooves, said printing roll being operative to engage the impression roll while a sheet of kraft paper continuously passes between the impression roll and the printing roll, a container means for receiving adhesive material, a fountain roll for removing adhesive from the container, an adjacent transfer roll for removing adhesive from the fountain roll and transferring it to the printing roll so that the printing roll is effective to apply or print a continuous pattern of adhesive upon a continuously advancing sheet of kraft paper, guide rolls for directing the printed kraft sheet and the polyethylene sheet into face-to-face contact whereby the polyethylene film is connected to the kraft paper in releasable fashion and in accordance with the adhesive pattern developed by the printing roll.

Other features and advantages of the present invention will become more apparent from a consideration of the succeeding specification when read in conjunction with the appended drawings in which:

FIG. 1 is a side view of a typical supply stand arrangement for feeding plural sheets of kraft paper and for combining a given sheet of kraft paper with polyethylene film in continuous fashion where all sheets are being fed in unison to a multi-wall bag making operation;

FIG. 2 is an enlarged view of a portion of FIG. 1;

Figure 5:
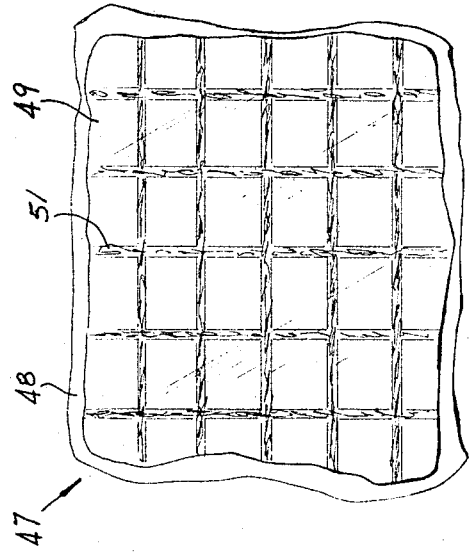
FIG. 5 is a fragmentary view, somewhat enlarged for clarity, showing a typical glue pattern for releasably securing a film of polyethylene to a sheet of kraft paper.

Referring now to the drawings, FIG. 1 shows a plurality of supply reels of kraft paper, useful to manufacture multi-wall sacks, identified by the reference numerals 11, 12, 13, 14 and 16. In addition, there is shown a supply reel of polyethylene film 17. Disposed between the reels 16 and 17 there is shown a film-paper combining unit indicated generally by the reference numeral 18. The sheets 19, 21, 22, 23 and 24 are shown advancing continuously to the right over a plurality of guide rolls A, B and C and thence to a heel roller D prior to entry into a multi-wall bag operation. Note that sheet 24 represents a composite of kraft paper and polyethylene film where the film is releasably connected to the kraft paper in accordance with the principles of the present invention.

Figure 3:
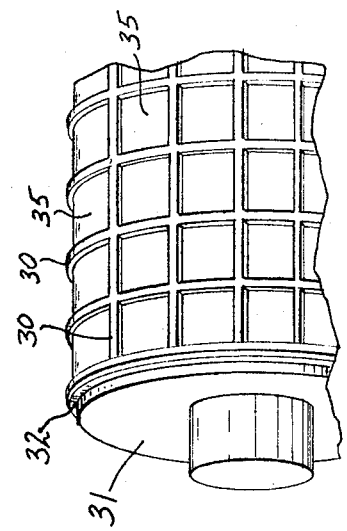
FIG. 3 is a plan view of the printing roll showing a typical glue pattern configuration.

Referring now to FIGS. 2 and 3, note that the laminating or combining unit 18 includes a drive roll 26, an intermediate roll 27 suitably connected for driving an impression roll 28 over which a sheet of kraft paper K continuously advances from supply stand 29. In contact with the impression roll 28 and bearing upon the kraft paper K is a printing roll 31 having a rubber cover 32 formed with an embossed pattern or waffle design as is more apparent in FIG. 3. The embossed pattern defines a plurality of protuberances or projections characterizing lands 35 with intervening undercuts or depressions defining grooves 30.

The pattern of printing roll 31 is merely exemplary and it is anticipated that the cross hatching or intersection of lands and grooves may define other planar, geometric patterns such as diamonds, circle, annuli, triangles, or the like. The only critical consideration with respect to the lands and grooves utilized is that the area of lands be no greater than 5 percent of a given unit area.

The printing roll 31 rotates in contact with transfer roll 33 in turn contacting fountain roll 34. The fountain roll is partially submerged in liquid adhesive 36 contained within trough 37. Rolls 31, 33 and 34 are suitably driven by means not shown and as fountain roll 34 rotates it picks up a film of adhesive which is subsequently transferred to roll 33 and thereafter picked up by the printing roll 31 as it rotates (in the direction shown) effective to apply a pattern of printing in the image of the lands on the rubber skin 32 of the roll.

As the kraft paper K traverses the bite between printing roll 31 and impression roll 28 the adhesive pattern is continuously printed. Supply roll 38 represents a reel of polyethylene film which is continuously advanced in the direction shown over guide roll 39 and guide roll 41. The guide roll 42, kraft paper K, and polyethylene film P are united in face-to-face contact and the film-kraft paper combination, identified by the letters P-K, proceeds to the right as viewed in FIG. 2. At this point the film P is releasably united with the paper K; however, there is sufficient connection between the two webs to keep the film and the kraft paper in alignment to effect a multi-wall bag fabrication operation using well known multi-wall tubers.

Figure 4:
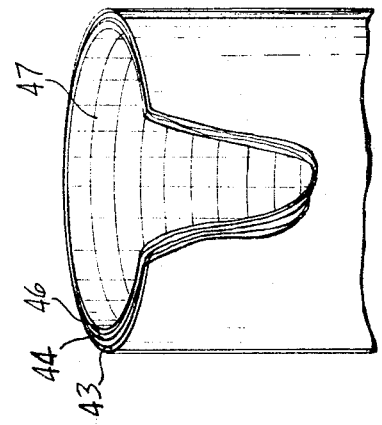
FIG. 4 shows a multi-wall bag utilizing the principles of the present invention.

FIG. 4 shows a multi-wall sack having three layers, plies, or tubes of kraft paper 43, 44 and 46. An inner composite ply 47 comprises a kraft paper web supporting a film of polyethylene of the general structure detailed in FIG. 5. Note that the composite ply 47 comprises kraft paper web 48 and polyethylene film 49 where the film is supported by and connected to paper 48 by the glue pattern represented by the cross hatching 51. Approximately 3 to 5 percent of each unit area of kraft paper (and/or polyethylene film) is covered by adhesive or glue.

Particular advantages of bags fabricated in accordance with the present invention are as follows:

(1) Where the polyethylene is releasably supported by and connected to the kraft paper, splits in the kraft paper do not develop splits in the polyethylene.

(2) The interior of the bag formed in this fashion is exceedingly free of paper fibers, lint, and other foreign matter which ordinarily develops when a bag is fabricated by other means.

(3) The present invention also facilitates the combination of polyethylene with kraft paper continuously and simultaneously with the formation of the multi-wall sacks. This feature aids greatly in reducing the contamination resulting from paper fibers, lint, etc.

It is anticipated that a wide variety of modifications and design changes may be devised without departing from the spirit and scope of the present invention.

What is claimed is:

1. In a multi-wall bag of the type having a plurality of layers of kraft paper and at least one discrete layer of plastic film, the improvement comprising adhesive means for releasably adhering the plastic layer to one of said kraft layers in accordance with a uniform, clearly discernible pattern or network, said network extending throughout the inner face between the plastic layer and the kraft layer, said adhesive pattern defining a relatively large total area which is free of adhesive means and a relatively small total area which is coated with adhesive means, said adhesive pattern further defining spaced, substantially continuous lines of adhesive means sandwiched between said one kraft layer and the plastic layer, the width of the lines of adhesive means and the spacing thereof relative to one another being so selected and arranged that the lines of adhesive means cover no more than about five percent of each unit area of kraft paper and plastic film between which the lines of adhesive means are sandwiched.

2. A multi-wall bag as defined in claim 1 in which said adhesive pattern or network defines a plurality of rectangles.

References Cited by the Examiner

UNITED STATES PATENTS

| | | | |
|---|---|---|---|
| 2,042,594 | 6/1936 | Fry et al. | 229—55 |
| 2,493,348 | 1/1950 | Hoppe | 229—55 |
| 2,493,349 | 1/1950 | Hoppe | 229—55 |
| 3,066,848 | 12/1962 | Billeb. | |
| 3,076,592 | 2/1963 | Means et al. | 229—55 |
| 3,217,871 | 11/1965 | Lee | 229—51 |

JOSEPH R. LECLAIR, *Primary Examiner.*

DAVID M. BOCKENEK, *Examiner.*